(12) United States Patent
Ulrey et al.

(10) Patent No.: US 8,661,814 B2
(45) Date of Patent: Mar. 4, 2014

(54) METHOD AND SYSTEM FOR CONTROLLING A TURBOCHARGER COMPRESSOR BYPASS

(75) Inventors: Joseph Norman Ulrey, Dearborn, MI (US); Keith Michael Plagens, Northville, MI (US); Henry W. Patterson, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 13/108,072

(22) Filed: May 16, 2011

(65) Prior Publication Data

US 2012/0291432 A1    Nov. 22, 2012

(51) Int. Cl.
*F02B 33/44*    (2006.01)
*F02B 33/00*    (2006.01)
*F16K 31/18*    (2006.01)

(52) U.S. Cl.
USPC .............. 60/611; 123/561; 123/564; 137/445

(58) Field of Classification Search
USPC ................. 60/611; 123/564, 561; 137/445
See application file for complete search history.

(56) References Cited

U.S. PATENT DOCUMENTS

| | | | | |
|---|---|---|---|---|
| 1,826,638 A * | 10/1931 | Schwerdtfeger | ............... | 123/564 |
| 2,067,757 A * | 1/1937 | Fielden | .......................... | 123/564 |
| 2,164,451 A * | 7/1939 | Fast | .............................. | 123/564 |
| 2,283,694 A * | 5/1942 | Perrine | .......................... | 123/564 |
| 2,311,936 A * | 2/1943 | Elfes et al. | ..................... | 123/564 |
| 2,356,379 A * | 8/1944 | Caris et al. | ..................... | 123/564 |
| 2,403,398 A * | 7/1946 | Reggio | .......................... | 123/561 |
| 2,703,561 A * | 3/1955 | Froehlich | ....................... | 123/564 |
| 2,988,070 A * | 6/1961 | Brueder | ......................... | 123/564 |
| 3,062,199 A * | 11/1962 | Brueder | ................... | 123/65 BA |
| 4,440,697 A * | 4/1984 | Sakurai | ................... | 123/184.38 |
| 4,466,414 A * | 8/1984 | Yoshimura et al. | ........... | 123/564 |
| 4,498,429 A * | 2/1985 | Satow et al. | ................... | 123/564 |
| 4,565,178 A * | 1/1986 | Nagase et al. | ................. | 123/564 |
| 4,870,822 A * | 10/1989 | Kamimaru | ...................... | 60/611 |
| 4,986,320 A * | 1/1991 | Kesterman et al. | ........... | 137/445 |
| 5,115,788 A * | 5/1992 | Sasaki et al. | ................... | 123/564 |
| 5,174,345 A * | 12/1992 | Kesterman et al. | ........... | 137/445 |
| 5,190,016 A * | 3/1993 | Takeda | .......................... | 123/564 |
| 5,226,397 A * | 7/1993 | Zabeck et al. | .................. | 123/516 |
| 5,307,783 A * | 5/1994 | Satoya et al. | .................. | 123/564 |
| 6,983,597 B2 * | 1/2006 | Wild et al. | ....................... | 60/611 |
| 7,578,128 B2 | 8/2009 | Miyauchi et al. | ............... | 60/611 |
| 7,621,128 B2 | 11/2009 | Czarnowski et al. | | |
| 7,677,227 B2 | 3/2010 | Sagisaka et al. | ................ | 60/611 |

FOREIGN PATENT DOCUMENTS

| | | | | | |
|---|---|---|---|---|---|
| EP | 1491748 | A2 | | 12/2004 | |
| JP | 58030414 | A | * | 2/1983 | .............. F02B 29/00 |
| JP | 58030415 | A | * | 2/1983 | .............. F02B 29/00 |
| JP | 02064248 | A | * | 3/1990 | .............. F02D 41/12 |
| JP | 02119624 | A | * | 5/1990 | .............. F02B 33/44 |

* cited by examiner

*Primary Examiner* — Thai Ba Trieu
(74) *Attorney, Agent, or Firm* — Julia Voutyras; Alleman Hall McCoy Russell & Tuttle LLP

(57) ABSTRACT

A turbocharger compressor bypass valve is disclosed. In one example, the compressor bypass valve operates inversely proportional to engine throttle operation. The approach may simplify compressor bypass valve control and reduced engine system complexity.

16 Claims, 5 Drawing Sheets

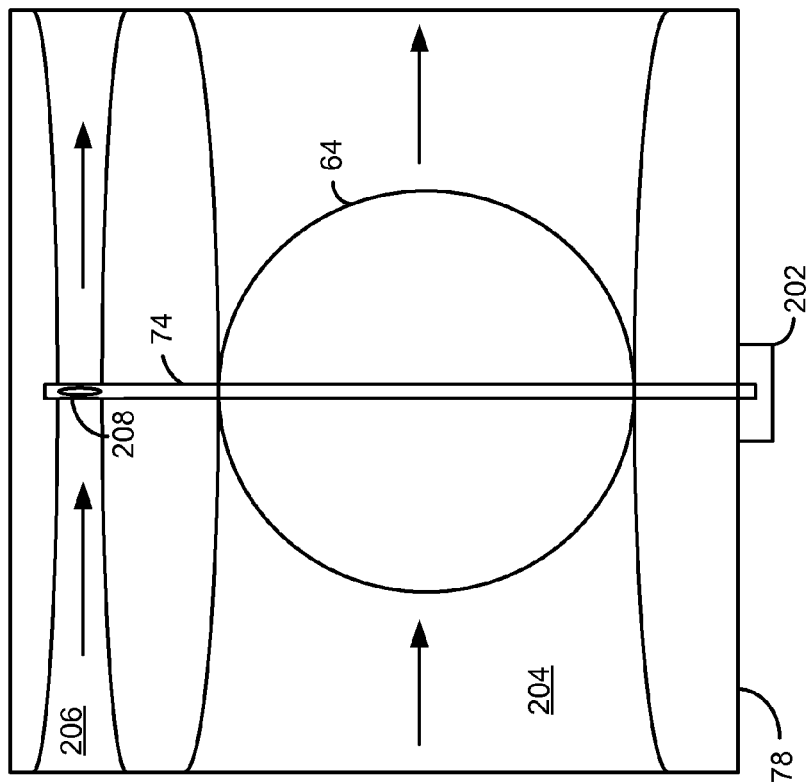
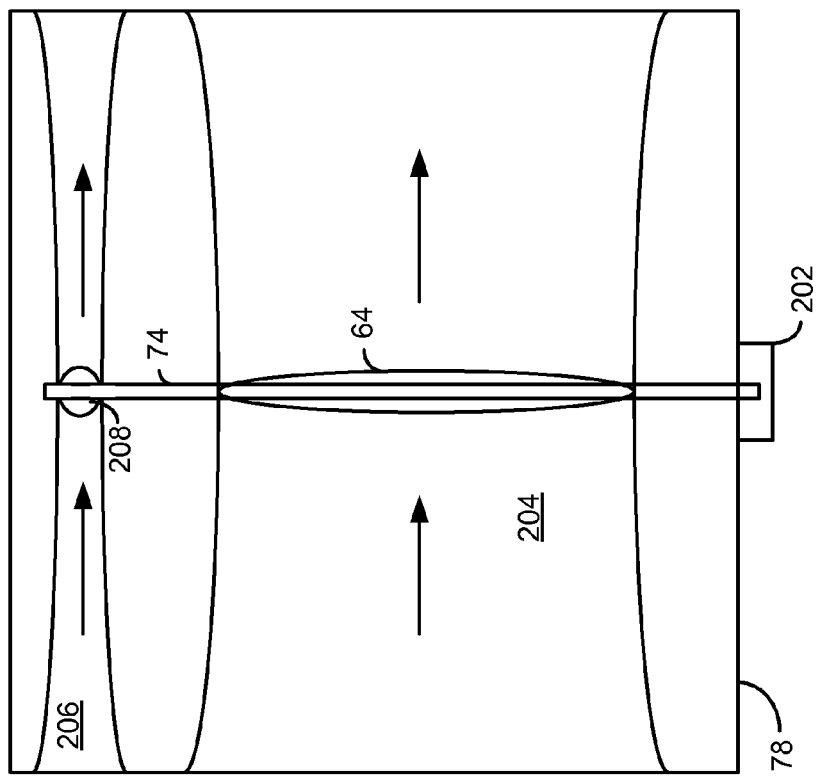

METHOD AND SYSTEM FOR CONTROLLING A TURBOCHARGER COMPRESSOR BYPASS

BACKGROUND/SUMMARY

Turbo charging an engine allows the engine to provide power similar to that of a larger displacement engine while engine pumping work is maintained near the pumping work of a normally aspirated engine of similar displacement. Thus, turbo charging can extend the operating region of an engine. However, during conditions where there is low flow through a compressor of the turbocharger and a high pressure ratio across the compressor, the compressor speed may surge and cause noise or other undesirable responses. Compressor surge may be mitigated via an electrically operated compressor bypass valve (CBV). In particular, the CBV may be opened to allow air to flow from the compressor outlet to the compressor inlet so as to reduce the pressure ratio across the compressor. The electrically operated CBV may be commanded open when compressor surge conditions are approached. For example, the CBV may be opened when an operator releases a torque command actuator (e.g., an accelerator pedal) and the engine throttle is closed to reduce engine torque. The electrically operated CBV may reduce the possibility of compressor surge; however, the electrically operated CBV requires a controller with executable code to open the electrically operated CBV at proper timing. Further, additional electronics may be needed to operate the CBV. Further still, the CBV can add cost to the turbocharged engine.

The inventors herein have recognized the above-mentioned disadvantages and have developed a system for reducing the possibility of turbocharger compressor surge, comprising: an engine throttle valve responsive to an engine torque command; and a compressor bypass valve in mechanical communication with the engine throttle.

In this way, the possibility of turbocharger compressor surge may be reduced without incurring additional system cost for electronics and code to operate a compressor bypass valve. In one example, a compressor bypass valve may be configured as a butterfly valve operated via a shaft that operates the engine throttle which controls air flow to the engine. In another example, the compressor bypass valve may be configured as a poppet valve operated via a cam that is rotated via a shaft that adjusts a position of a throttle valve. Thus, the compressor bypass valve may be operated via the same electronics that operate the engine throttle.

The present description may provide several advantages. In particular, the present description may simplify operation of the compressor bypass valve as it may be operated via the engine throttle actuator. Further, the present description may reduce system cost since the compressor bypass valve may be operated via the same electronics as the engine throttle. Further still, additional computer code for operating the compressor bypass valve may not be necessary. Consequently, additional time may be available for the engine controller to operate other actuators and monitor other system inputs.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2A-2B and 3A-3B show two example compressor bypass valves;

DETAILED DESCRIPTION

Figure 1:
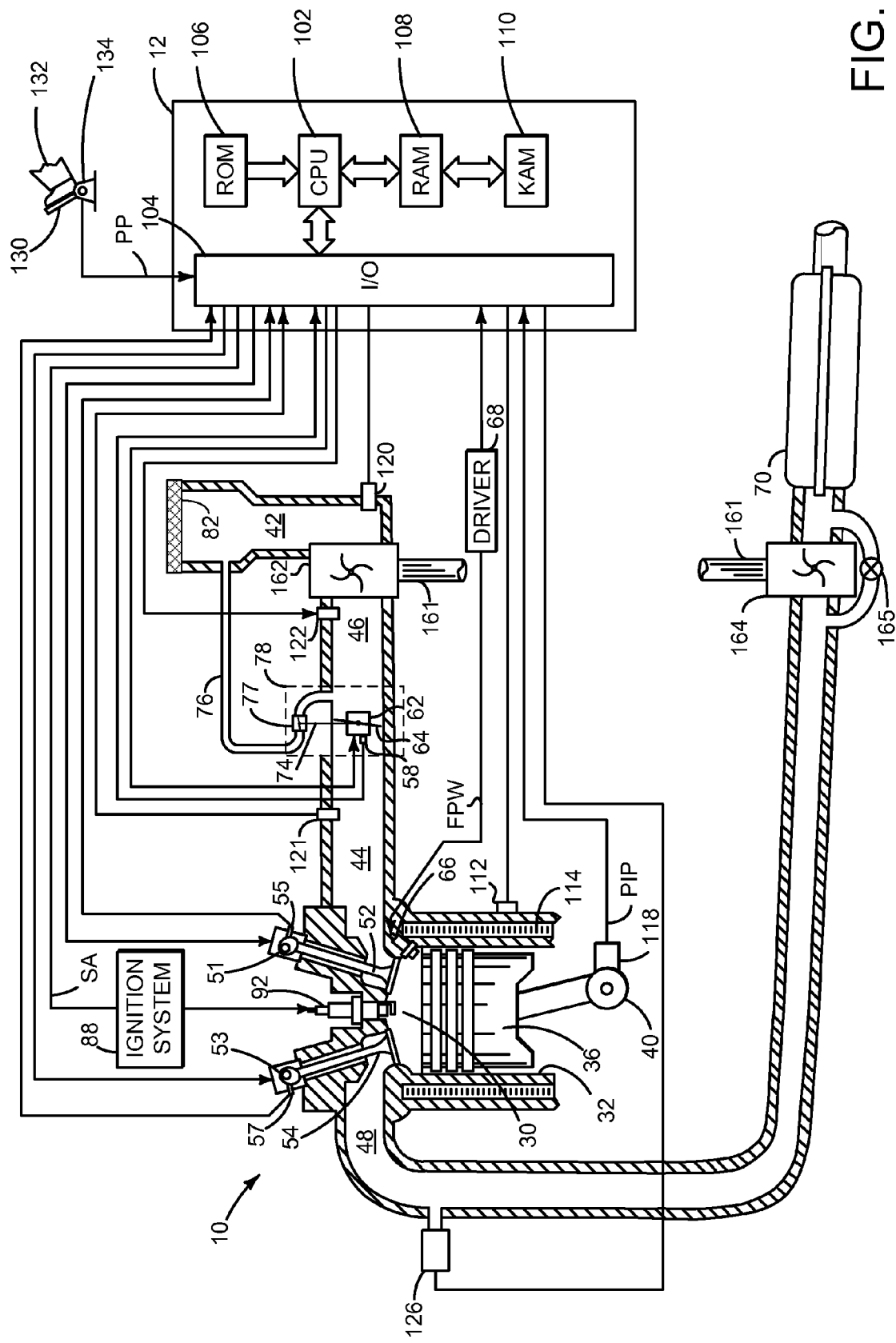
FIG. 1 shows a schematic depiction of an engine and turbocharger.
Figure 4:
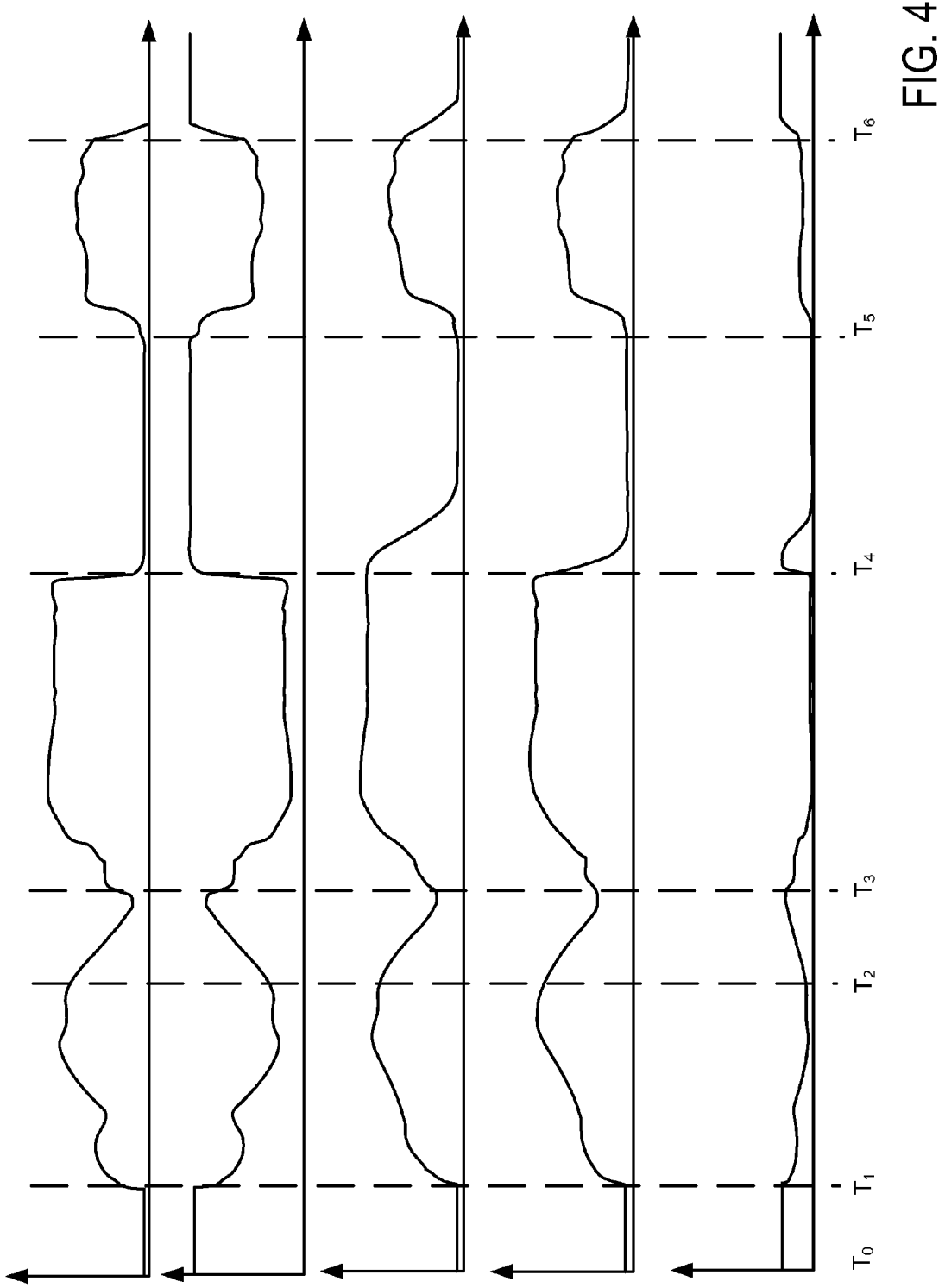
FIG. 4 shows a simulated example engine operating sequence.
Figure 5:
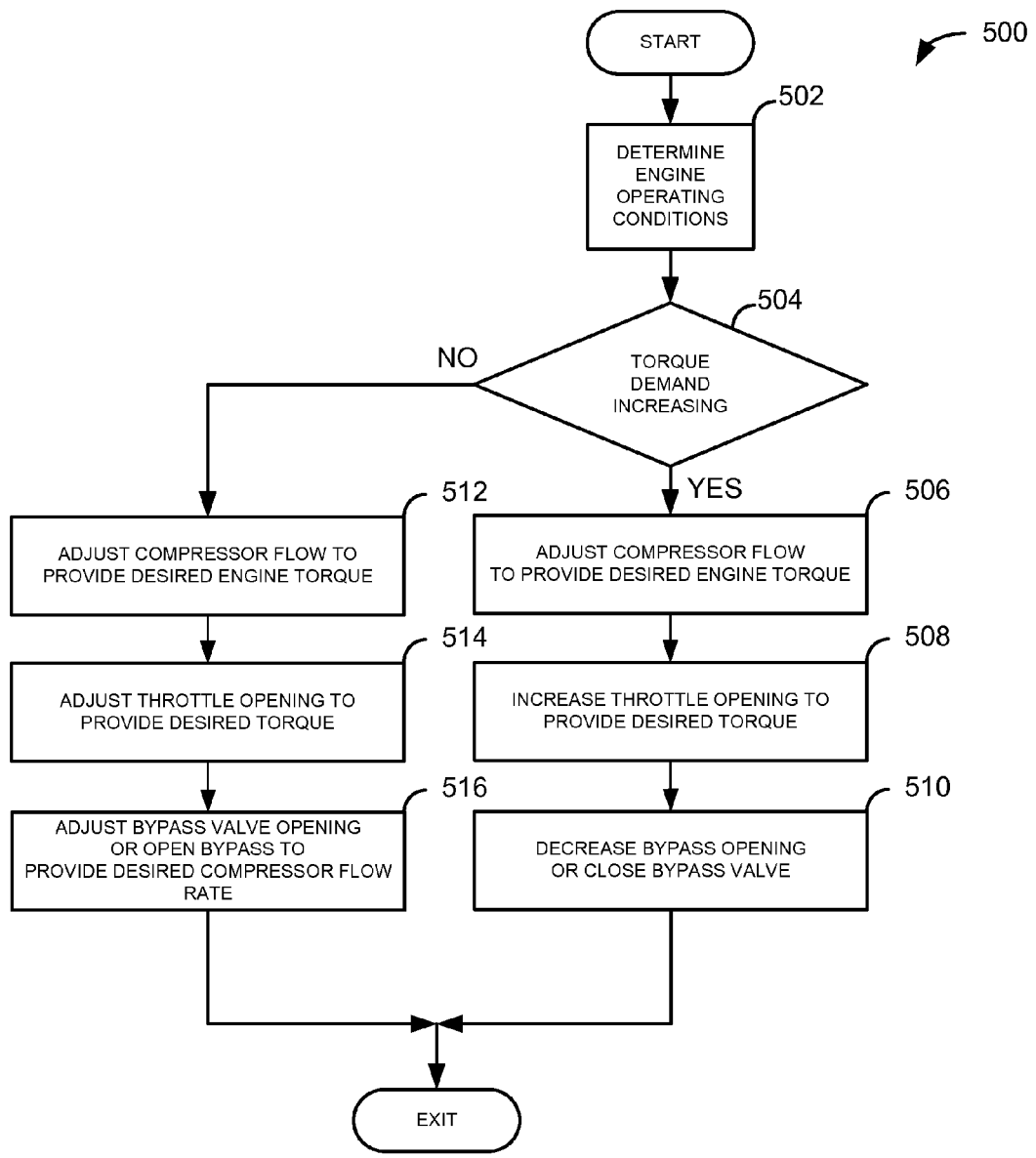
FIG. 5 shows a high level flowchart of a method for operating a turbocharger compressor bypass valve.

The present description is related to operating a turbocharger coupled to an engine. FIG. 1 shows an example engine that includes a turbocharger and compressor bypass valve. FIGS. 2A-2B and 3A-3B show example turbocharger compressor bypass valves. FIG. 4 shows simulated signals of interest when operating a compressor bypass valve that is mechanically coupled to an engine throttle. FIG. 5 shows a high level flowchart for controlling an engine having a compressor bypass valve that is in mechanical communication with an engine throttle valve that controls air flowing to engine cylinders.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with throttle body 78 including electronic throttle 62 which adjusts a position of throttle plate 64 to control air flow from intake boost chamber 46. In other examples, the throttle may be mechanically operated by a vehicle driver. Shaft 74 mechanically couples engine throttle plate 64 to compressor bypass valve 77.

Compressor 162 draws air through air filter 82 and air intake 42 to supply boost chamber 46. Exhaust gases spin turbine 164 which is coupled to compressor 162 via shaft 161. Waste gate actuator 165 may be electrically or vacuum operated and it allows exhaust gases to bypass turbine 164 so that boost pressure can be controlled under varying operating conditions. Compressor bypass valve 77 is operated via electronic throttle 62 and directs air from the outlet of compressor 162 to the compressor inlet of compressor 162 via conduit 76. Boost pressure in boost chamber 46 may be reduced when compressor bypass valve 77 is opened since output of compressor 162 is fed back to the input of compressor 162.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Engine exhaust gases are directed to converter 70. Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Referring now to FIGS. 2A and 2B, one example of a compressor bypass valve mechanically coupled to an engine throttle is shown in two different positions. FIGS. 2A and 2B show plan view cross sections of throttle body 78. FIG. 2A shows the throttle plate 64 of the engine throttle in a substantially fully closed position while FIG. 2B shows the throttle plate 64 in a substantially fully open position. The engine throttle and compressor bypass valves shown in FIGS. 2A and 2B may be coupled to an engine as shown in FIG. 1. Air flows through the throttle passage 204 and the compressor bypass passage 206 in the direction of the arrows.

Throttle body 78 includes a first engine air passage 204 directing air to engine cylinders. Air flow through passage 204 may be restricted via throttle plate 64. Throttle plate 64 may be rotated via shaft 74. Shaft 74 is in communication with compressor bypass valve plate 208 and electric device 202. In one example, electric device 202 may be a motor electrically coupled to controller 12 of FIG. 1. Throttle plate 64 and bypass valve plate 208 rotate together as shaft 74 is rotated via electric device 202. Bypass valve plate 208 may restrict air flow through passage 206. In one example, passage 206 provides a portion of a pneumatic coupling between a turbocharger compressor inlet and a turbocharger compressor outlet.

FIG. 2A shows that when throttle plate 64 is substantially fully closed, bypass valve plate 208 is substantially fully open. Bypass valve plate 208 moves inversely proportionately to throttle plate 64 when electric device 202 rotates shaft 74. Air flowing through passage 206 is pneumatically isolated within throttle body 78 from air passing through passage 204. In one example, bypass valve plate 208 and passage 206 are sized to provide an engine air amount to support combustion at stoichiometric conditions during warm engine idle. Thus, throttle plate 64 may be substantially fully closed during warm engine idle conditions while the engine idles. As throttle plate 64 opens in response to an increasing engine torque demand, the bypass valve plate 208 closes. Throttle plate 64 is shown perpendicular to air flow direction in passage 204 when throttle plate 64 is substantially fully closed. Bypass valve plate 208 is shown parallel to the air flow direction in passage 206.

FIG. 2B shows throttle plate 64 in a substantially fully open position where air flow direction in passage 204 is in parallel with throttle plate 64. At the same time, bypass valve plate 208 is perpendicular to the direction of air flow in passage 206. FIG. 2B may represent throttle plate position during aggressive vehicle acceleration while FIG. 2A may represent throttle plate position after aggressive vehicle acceleration. Since throttle plate 64 is mechanically coupled to bypass valve plate 208, bypass valve plate 208 may be operated without electronics additional to the electronics operating throttle plate 64.

Figure 3B:
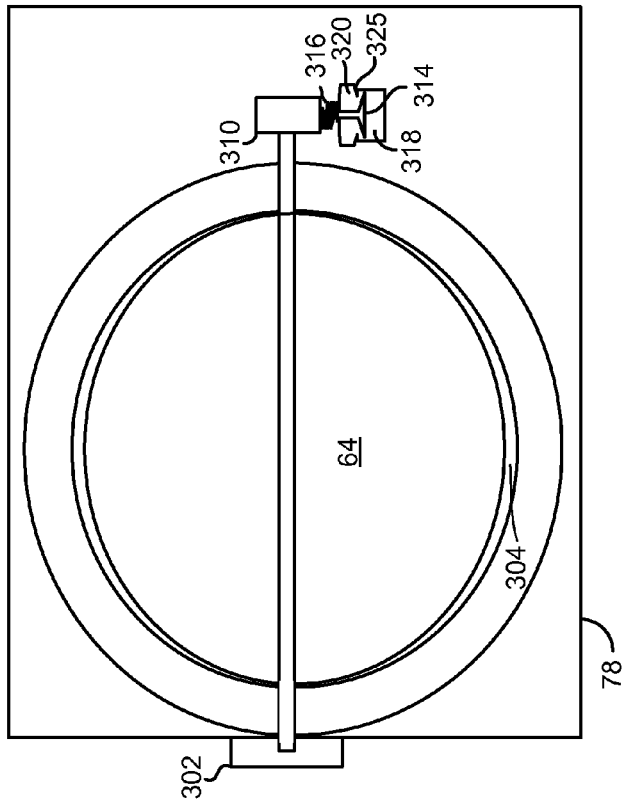
Figure 3A:
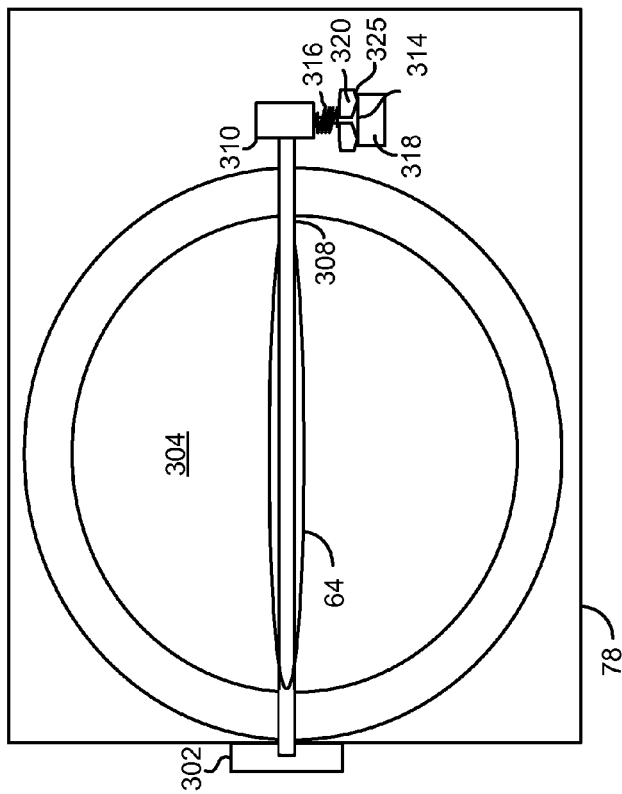

Referring now to FIGS. 3A and 3B, a second example of a throttle body 78 having a throttle plate 64 mechanically coupled to a bypass valve 314 is shown. FIGS. 3A and 3B are cross sections of a throttle body looking into the throttle body in a direction of air flow. In the present example, bypass valve 314 is shown as a poppet valve. FIG. 3A shows throttle plate 64 in a substantially fully open position while FIG. 3B shows throttle plate 64 in a substantially fully closed position.

FIG. 3A shows that electric device 302 is coupled to shaft 308 which in turn is mechanically coupled to throttle plate 64 and bypass valve 314 via cam 310. A portion of cam 310 is a base circle that provides no lift to raise bypass valve 314 off of valve seat 325. FIG. 3A shows the base circle of cam 310 interfacing with bypass valve 314. Another portion of cam 310 is elevated from the base circle such that when shaft 308 is rotated, bypass valve 314 is lifted from valve seat 325 so as to allow air to flow through the compressor bypass valve inlet 320 to the compressor bypass valve outlet 318. Bypass valve 314 is in a closed position as shown when throttle plate 64 is in an open position as shown. Engine throttle passage 304 is shown in a low flow restriction position when throttle plate 64 is parallel to the direction of air flow as shown. Spring 316 provides a force to close bypass valve 314 against valve seat 325. Air can pass through throttle passage 304 when throttle plate 64 is positioned parallel to the air flow direction.

FIG. 3B shows that electric device 302 causes bypass valve 314 to open from valve seat 325 allowing flow from bypass valve inlet 320 to the compressor bypass valve outlet 318 when electric device 302 rotates. Cam 314 is shown in a high lift portion elevated from the base circle. The high lift portion of cam 314 compresses spring 316 and opens bypass valve 314 when throttle plate 64 is in a closed position. Engine throttle passage 304 is shown in a higher flow restriction position when throttle plate 64 is positioned perpendicular to the direction of air flow as shown.

Thus, the systems as shown in FIGS. 1-3B provide for controlling turbocharger compressor surge, comprising: an engine throttle valve responsive to an engine torque command; and a compressor bypass valve in mechanical communication with the engine throttle. The system includes where the compressor bypass valve is a poppet valve. In another example, the system includes where the compressor bypass valve is a butterfly valve. The system also includes where the compressor bypass valve and the engine throttle valve are integral to an engine throttle body. The system also includes where the compressor bypass valve is adjusted proportionally to adjustment of the engine throttle valve. In one example, the system includes where the compressor bypass valve is substantially fully open when the engine throttle valve is substantially fully closed. The system also includes where the compressor bypass valve and the engine throttle valve are operated by a single common shaft, and where a plate of the bypass valve and a plate of the engine throttle valve are coupled to the single common shaft.

In addition, the systems as shown in FIGS. 1-3B provide for controlling turbocharger compressor surge, comprising: a turbocharger coupled to an engine; an engine throttle valve responsive to an engine torque command; and a compressor bypass valve mechanically coupled to the engine throttle valve, the compressor bypass valve positioned along an air flow path between an inlet and an outlet of a compressor of the turbocharger. The system further comprises a controller, the controller including instructions to adjust exhaust gas flow through a turbine of the turbocharger. In yet another example, the system further comprises additional instructions for reducing exhaust flow through the turbine in response to a reduction in an engine torque request. The system also includes where the compressor bypass valve is a poppet valve. The system further includes where the poppet valve is opened via a cam and returned via a spring. In one example, the system includes where the engine throttle valve is an electrically actuated throttle valve. Therefore, the bypass valve and the throttle may be controlled via a single group of electronics directed to controlling the throttle. The system also includes where the engine throttle valve is positioned along an engine air intake path downstream of the compressor.

Referring now to FIG. 4, prophetic signals of interest during an engine operating sequence are shown. The signals of FIG. 4 may be provided by the system of FIG. 1 executing the method of FIG. 5 via instructions of controller 12. Vertical markers $T_0$-$T_6$ are provided to indicate conditions of interest during the sequence.

The first plot from the top of FIG. 4 represents engine throttle plate position (e.g., 64 of FIG. 1). The X axis represents time and time increases from the left to right side of the plot. The Y axis represents throttle plate position and increasing throttle plate position increases throttle opening allowing greater air flow. The throttle opening area increases in the direction of the Y axis arrow. The throttle position may be adjusted in response to an engine torque command.

The second plot from the top of FIG. 4 represents CBV plate position. The CBV plate is mechanically coupled to the engine throttle plate an responds inversely proportionate to engine throttle plate. The X axis represents time and time increases from the left to right side of the plot. The Y axis represents CBV plate position and compressor bypass plate position increases in the direction of the Y axis arrow. Air flow through the CBV can increase when the position of the bypass plate increases so as to increase the CBV opening area.

The third plot from the top of FIG. 4 represents compressor pressure ratio versus time. The X axis represents time and time increases from the left to right side of the plot. The Y axis compressor pressure ratio and compressor pressure ratio increases in the direction of the Y axis arrow.

The fourth plot from the top of FIG. 4 represents compressor flow (e.g., compressor 162 of FIG. 1) versus time. The X axis represents time and time increases from the left to right side of the plot. The Y axis represents compressor flow rate and compressor flow rate increases in the direction of the Y axis arrow.

The fifth plot from the top of FIG. 4 represents compressor bypass flow rate versus time. The X axis represents time and time increases from the left to right side of the plot. The Y axis represents compressor bypass flow rate and compressor bypass flow rate increases in the direction of the Y axis arrow.

At time $T_0$, the throttle plate position is substantially closed and the compressor bypass plate position is substantially open. During such conditions the engine may be at warm idle conditions combusting a substantially stoichiometric air-fuel mixture. The compressor pressure ratio is also shown at a low level as is the compressor flow. Consequently, the turbocharger compressor is not at surge conditions. The compressor bypass flow is at a relatively high flow rate for a compressor bypass passage.

At time $T_1$, engine throttle plate position begins to increase to allow additional air to enter the engine. Since the CBV responds inversely proportional to the engine throttle, air flow through the compressor bypass passage (e.g., 76 of FIG. 1) is reduced. The increasing throttle position is indicative of an increasing engine torque request, a request to accelerate the vehicle for example. The compressor pressure ratio also increases as the engine throttle opening increases. The compressor pressure ratio increases as air flowing through the compressor increases. The fourth plot from the top of FIG. 4 indicates an increasing compressor air flow rate. Air flow through the CBV decreases as the throttle opening is increased via moving the throttle plate.

At time $T_2$, engine throttle opening is reduced at a relatively low rate via changing the position of the throttle plate. Since the throttle opening is changing at a relatively low rate, the engine can consume air from the compressor at a rate that reduces the possibility of compressor surge. In particular, the engine consumes air at a rate that limits the pressure ratio across the compressor and allows a middle level of air to flow through the compressor even though the throttle opening is reduced. The CBV position also changes so as to increase air to flow from the compressor outlet to the compressor inlet.

At time $T_3$, engine throttle opening increases to allow additional air to flow to the engine. The compressor bypass valve position decreases to reduce the amount of air flowing from the compressor outlet to the compressor inlet, thereby increasing the turbocharger compressor efficiency. The pressure ratio across the turbocharger compressor also increases as the compressor air flow rate increases so that additional air may be provided to the engine so that the engine torque demand may be met.

At time $T_4$, engine throttle position changes at a higher rate of speed so as to reduce engine torque in response to an engine torque command reduction. During a similar transition where no CBV is present, closing the throttle at a higher rate of speed can reduce air flow through the turbocharger compressor and increase the compressor pressure ratio. However, when the CBV is mechanically coupled to the throttle and the throttle closes, air flow from the outlet of the turbocharger compressor increases to the inlet of the compressor. Consequently, the compressor flow rate and compressor pressure ratio are maintained at levels that limit the possibility of turbocharger compressor surge. Further, compressor efficiency may be reduced. Thus, it can be seen after time $T_4$, the compressor pressure ratio decays over time as does the compressor flow rate even though the engine throttle is closed. Air continues to flow through the compressor via the CBV as shown in the fifth plot from the top of FIG. 4.

At time $T_5$, the engine throttle position is increased again and the bypass valve is closed in proportion to the opening of the engine throttle. The compressor flow rate and the compressor pressure ratio also increase so as to supply additional air to meet the engine torque request. The compressor bypass flow rate decreases as the engine throttle opening is increased.

At time $T_6$, the engine throttle is reduced at a rate slower than at time $T_4$ and faster than at time $T_2$. The compressor pressure ratio and the compressor flow rate decrease as the throttle opening is decreased. In particular, the compressor flow rate and compressor pressure ratio are at levels that limit the possibility of compressor surge. Thus, a portion of air flowing through the turbocharger compressor flows into the engine while the remaining amount of air flowing through the turbocharger compressor is directed through the CBV.

In this way, it may be possible to reduce the possibility of compressor surge without having to control a CBV via electronics separate from engine throttle electronics. Thus, control of the CBV occurs by controlling the position of the engine throttle. Consequently, control of the CBV may be simplified.

Referring now to FIG. 5, a method for operating a turbocharger compressor bypass valve is shown. The method FIG. 5 may be executed via instructions of controller 12 in the system as shown in FIG. 1. Further, the method of FIG. 5 may provide the operating sequence illustrated in FIG. 5.

At 502, method 500 determines engine operating conditions. Engine operating conditions may include but are not limited to engine speed, engine air amount, engine temperature, engine torque demand, ambient temperature, and ambient pressure. Method 500 proceeds to 504 after engine operating conditions are determined.

At 504, method 500 judges whether or not engine torque demand is increasing. The engine torque demand may be made via an operator request or a request of a controller (e.g., a hybrid engine controller). If it is judged that the torque demand is increasing, method 500 proceeds to 506. Otherwise, method 500 proceeds to 512.

At 506, method 500 adjusts air flow through the turbocharger compressor to provide a desired engine torque. The compressor air flow rate can be increased by adjusting a position of a turbocharger wastegate or of a turbocharger turbine vane. The compressor air flow rate may be increased as the engine torque demand increases. Method 500 proceeds to 508 after the compressor flow rate is adjusted.

At 508, method 500 increases engine throttle opening to provide the desired torque level. In one example, a position of a throttle plate is adjusted based on a pressure ratio across the throttle and the desired engine air flow rate. The desired engine air flow rate may be empirically determined and related to the desired engine torque amount. Method 500 proceeds to 510 after the engine throttle plate is adjusted.

At 510, method 500 decreases the CBV opening amount inversely proportional to the engine throttle opening amount. In an example where the CBV is mechanically coupled to the engine throttle, the bypass valve opening amount may be reduced by simply opening the engine throttle as shown in FIGS. 2A-2B and 3A-3B. In other examples, a position of the CBV may be electrically adjusted in response to engine throttle position. Method 500 proceeds to exit after the bypass valve opening is at least partially closed in response to partially closing an engine throttle in response to an engine torque demand.

At 512, method 500 adjusts the turbocharger compressor air flow to provide a desired amount of engine torque. The air flow rate through the turbocharger compressor may be decreased in response to a decrease in engine torque request. In one example, flow rate through a turbocharger compressor may be decreased by opening a normally closed turbocharger wastegate. Method 500 proceeds to 514 after the air flow rate through the compressor is adjusted.

At 514, method 500 adjusts an engine throttle opening amount to provide a desired level of engine torque. In one example, the throttle opening amount can be adjusted by closing a throttle plate. Further, the throttle opening amount can be decreased in response to a decreasing engine torque request. Method 500 proceeds to 516 after adjusting the engine throttle opening amount.

At 516, method 500 adjusts a position of a CBV to provide a desired compressor flow rate. In one example, the CBV and bypass passage are mechanically sized to provide a threshold level of compressor bypass air flow so as to reduce the possibility of the turbocharger compressor entering surge conditions. In particular, the CBV is sized to maintain compressor flow above a threshold level that limits the possibility of compressor surge. The compressor bypass valve may be configured as illustrated in FIGS. 2A-2B, 3A-3B, or in an alternative configuration, if desired. Method 500 proceeds to exit after the position of the CBV is adjusted to provide a desired compressor flow rate.

Thus, the method of FIG. 5 provides for a method for controlling surge of a turbocharger compressor, comprising: adjusting a position of an engine throttle valve in response to an engine torque request; and adjusting a position of a compressor bypass valve via the engine throttle. The method also includes where a position of the compressor bypass valve is adjusted proportionately with a position of the engine throttle valve. The method further comprises adjusting a position of a turbocharger wastegate in response to the engine torque request. The method also includes where the compressor bypass valve is mechanically coupled to the engine throttle valve. The method further includes where air is directed from an outlet of a compressor to an inlet of the compressor via the compressor bypass valve when flow through the compressor is less than a threshold level and when a pressure ratio across the compressor is greater than a threshold level. The method further comprises directing air flow from the outlet of the compressor to the inlet of the compressor via the compressor bypass valve during engine idle conditions when the engine throttle valve is substantially closed.

As will be appreciated by one of ordinary skill in the art, the methods described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for controlling surge of a turbocharger compressor, comprising:
    adjusting a position of an engine throttle valve in response to an engine torque request; and
    adjusting a position of a compressor bypass valve via a cam on a shaft of the engine throttle, where air is directed from an outlet of a compressor to an inlet of the compressor via the compressor bypass valve when flow through the compressor is less than a threshold level and when a pressure ratio across the compressor is greater than a threshold level.

2. The method of claim 1, where the position of the compressor bypass valve is adjusted proportionately with the position of the engine throttle valve.

3. The method of claim 1, further comprising adjusting a position of a turbocharger wastegate in response to the engine torque request.

4. The method of claim 1, further comprising directing air flow from the outlet of the compressor to the inlet of the compressor via the compressor bypass valve during engine idle conditions when the engine throttle valve is substantially closed.

5. The method of claim 4 wherein the compressor bypass valve is a poppet valve.

6. The method of claim 4 wherein the compressor bypass valve is a butterfly valve.

7. A method for controlling surge of a turbocharger compressor, the turbocharger compressor coupled to an engine intake upstream of an electronically controlled engine throttle valve, comprising:
    adjusting a position of the engine throttle valve in response to an engine torque request; and
    adjusting a position of a compressor bypass poppet valve in mechanical communication with the engine throttle valve via a cam on a shaft of the throttle valve, where air is directed from an outlet of a compressor to an inlet of the compressor via the compressor bypass poppet valve when flow through the compressor is less than a threshold level and when a pressure ratio across the compressor is greater than a threshold level.

8. The method of claim 5, where a position of the compressor bypass poppet valve is adjusted proportionately with a position of the engine throttle valve.

9. The method of claim 5, further comprising adjusting a position of a turbocharger wastegate in response to the engine torque request.

10. The method of claim 5, where the compressor bypass poppet valve is coupled to a return spring.

11. The method of claim 5, further comprising directing air flow from the outlet of the compressor to the inlet of the compressor via the compressor bypass poppet valve during engine idle conditions when the engine throttle valve is substantially closed.

12. A system for controlling turbocharger compressor surge, comprising:
    a turbocharger coupled to an engine;
    an engine throttle valve responsive to an engine torque command; and
    a compressor bypass poppet valve mechanically coupled to the engine throttle valve positioned along an air flow path between an inlet and an outlet of a compressor of the turbocharger and opened via a cam actuated by a shaft of the throttle valve and returned via a spring.

13. The system of claim 12, further comprising a controller, the controller including instructions to adjust exhaust gas flow through a turbine of the turbocharger.

14. The system of claim 13, further comprising additional instructions for reducing exhaust flow through the turbine in response to a reduction in an engine torque request.

15. The system of claim 12, where the engine throttle valve is an electrically actuated throttle valve.

16. The system of claim 12, where the engine throttle valve is positioned along an engine air intake path downstream of the compressor.

* * * * *